United States Patent
Watanabe et al.

(10) Patent No.: US 7,185,346 B2
(45) Date of Patent: Feb. 27, 2007

(54) LOW-PROFILE DISK UNIT

(75) Inventors: Takashi Watanabe, Ichikawa (JP); Taku Sato, Kodaira (JP)

(73) Assignee: TEAC Corporation (JP)

( * ) Notice: Subject to any disclaimer, the term of this patent is extended or adjusted under 35 U.S.C. 154(b) by 276 days.

(21) Appl. No.: 10/373,447

(22) Filed: Feb. 24, 2003

(65) Prior Publication Data

US 2003/0202447 A1 Oct. 30, 2003

(30) Foreign Application Priority Data

Feb. 22, 2002 (JP) ............................ 2002-046870
Feb. 22, 2002 (JP) ............................ 2002-046877

(51) Int. Cl.
*G11B 17/04* (2006.01)

(52) U.S. Cl. .................................................. 720/613
(58) Field of Classification Search ................ 720/613
See application file for complete search history.

(56) References Cited

U.S. PATENT DOCUMENTS 6,628,597 B2 * 9/2003 Yeh et al. .................... 720/676

* cited by examiner

*Primary Examiner*—David Davis
(74) *Attorney, Agent, or Firm*—Anderson Kill & Olick, PC

(57) ABSTRACT

A disk unit includes a tray including a turntable to which a disk-like recording medium is attached, a tray guide mechanism supporting the tray so that the tray is movable between a disk-replacing position and a disk-loading position, and a cover formed to cover the disk-like recording medium when the tray is moved to the disk-loading position. The cover comprises a guide support part supporting the tray guide mechanism.

19 Claims, 14 Drawing Sheets

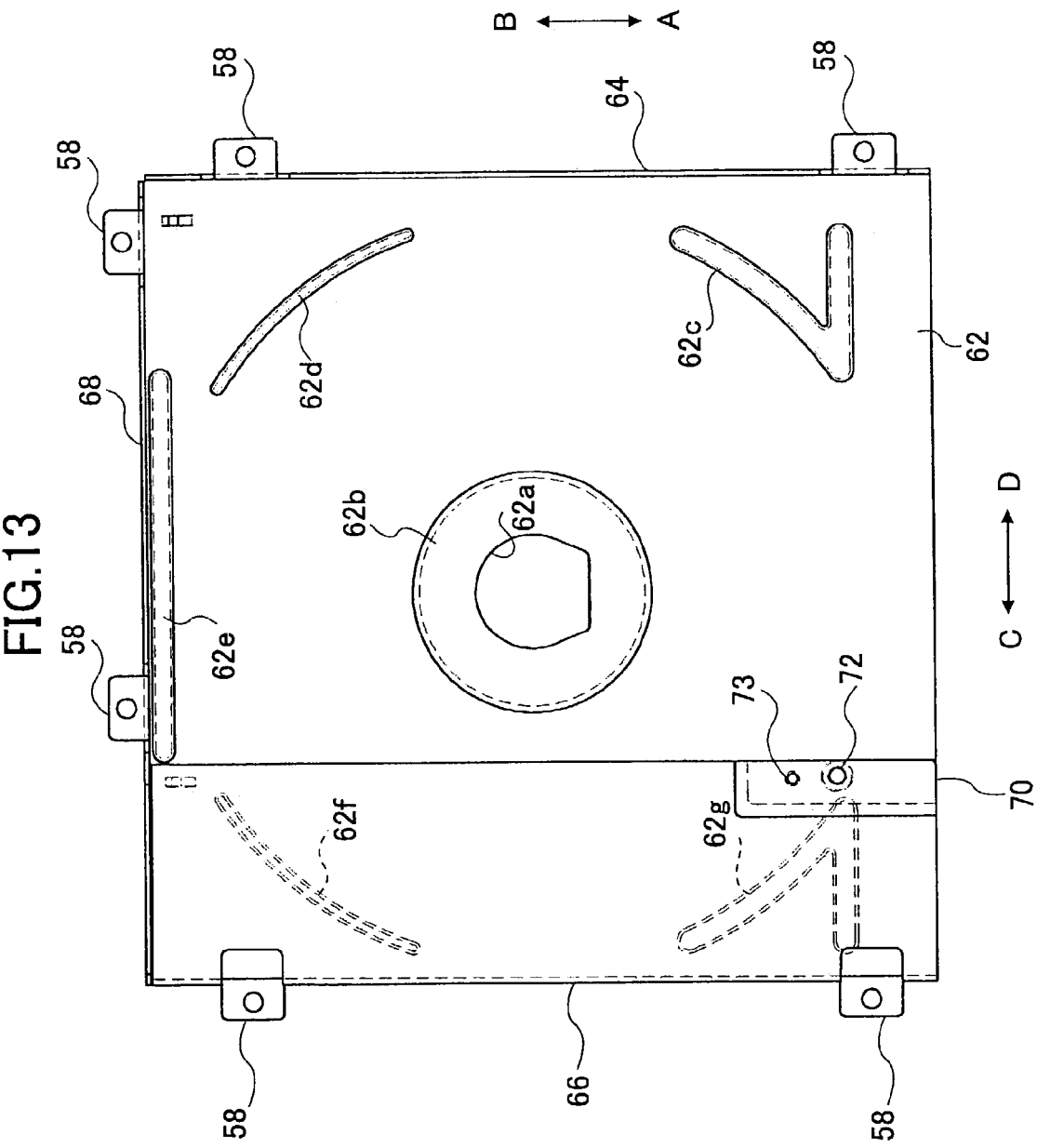

FIG.15A
FIG.15B
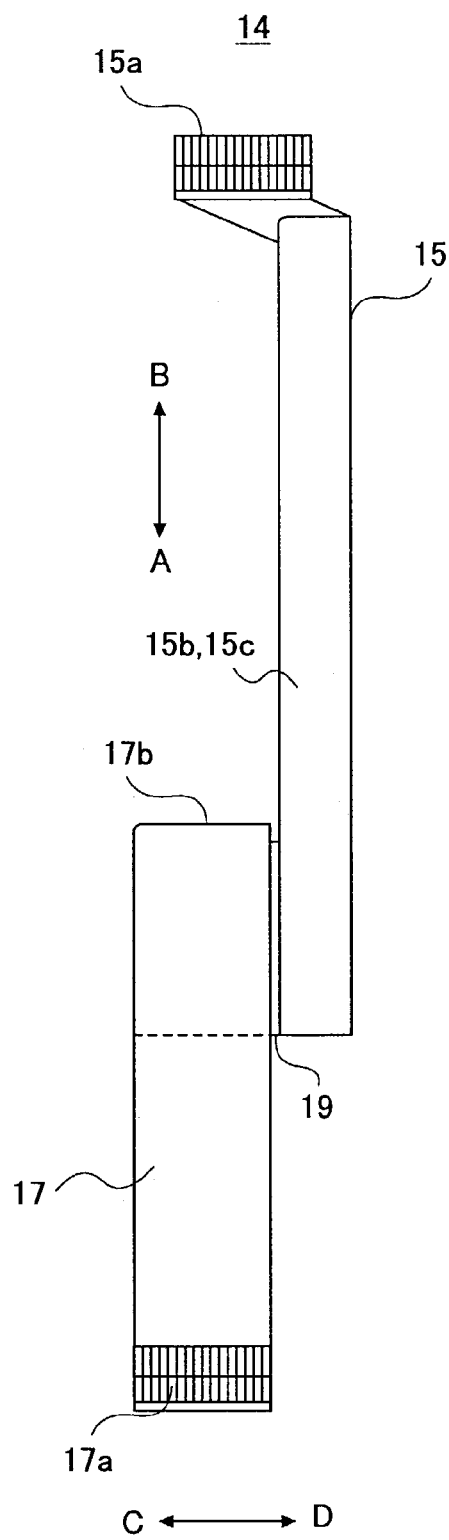
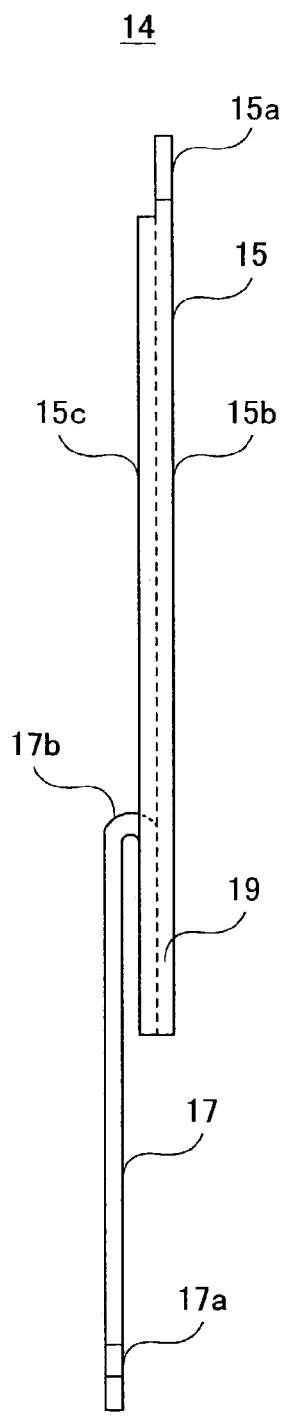

LOW-PROFILE DISK UNIT

BACKGROUND OF THE INVENTION

1. Field of the Invention

The present invention generally relates to disk units, and more particularly to a disk unit whose tray with a disk-like recording medium attached thereto is movable to a position where data can be recorded on or reproduced from the recording medium.

2. Description of the Related Art

Conventional disk units include CD-ROM units for use in notebook personal computers. In such CD-ROM units, a tray to which a disk-like recording medium (hereinafter referred to simply as a "disk") is attached is formed to have a width smaller than the diameter of the disk so that the CD-ROM units can be accommodated in personal computers reduced in thickness and weight.

In such CD-ROM units, as shown in FIGS. 1A and 1B, for instance, a tray 3 is supported so as to be slidable in a tray housing 2 of a metal frame 1. A turntable 4 to which a disk 7 is clamped is provided to the upper surface 3a of the tray 3. Further, inside the tray 3, a motor that rotates the turntable 4 and an optical pickup 5 that reads information recorded on the disk are provided. The motor is not shown in FIG. 1A or 1B because the motor is hidden by the turntable 4.

An eject button (not shown in the drawings) is provided to a front bezel 6 attached to the front face of the tray 3. The eject button is pressed to release a lock by a lock mechanism (not shown in the drawings) so that the tray 3 is movable in the direction of ejection. Further, the tray 3 has a width smaller than the diameter (12 cm) of the disk 7.

The frame 1 has a projecting part 8 formed on one side of the tray housing 2 so as to extend to oppose a crescent-like projecting part of the disk 7 from the tray 3. Further, the tray 3 housed in the tray housing 2 and the projecting part 8 of the frame 1 are covered with a cover of sheet metal (not shown in the drawings) from above. The frame 1 and the cover form a case containing the tray 3.

The disk 7 is clamped to the turntable 4 so as to oppose the upper surface 3a and the projecting part 8, and is rotated in the space covered by the cover.

As shown in FIG. 1B, the right and left sides of the tray 3 are supported by a pair of tray guide mechanisms 9 so as to be slidable. One of the tray guide mechanisms 9 is attached between the right side of the frame 1 and the right side of the tray 3, and the other one of the tray guide mechanisms 9 is attached between the left side of the frame 1 and the left side of the tray 3

Further, each of the tray guide mechanisms 9 includes a guide rail 9a, a slide rail 9b, and a guide rail 9c. The guide rail 9a is attached to the sides of the tray 3. The slide rail 9b is formed to have a C-shaped cross section so as to slide on the guide rail 9a. The guide rail 9c is formed to have a C-shaped cross section so as to enclose the slide rail 9b. When the disk unit of FIGS. 1A and 1B is used in a horizontal position, the tray 3 is supported by the tray guide mechanisms 9 provided to the right and left sides of the tray 3 so as to be slidable.

SUMMARY OF THE INVENTION

Further reduction in thickness is required of the disk unit having the above-described configuration. There is a limit, however, to the reduction of the turntable 4, the turntable motor, and the optical pickup 5 in thickness, which makes it difficult to further reduce the disk unit in thickness.

Further, conventionally, the tray guide mechanism 9 guiding the movement of the tray 3 is supported by the frame 1, and the cover covering the tray 3 from its upper side is attached to the frame 1. This increases the cumulative value of the dimensional tolerances of the members, thus making it difficult to reduce the clearance between the tray 3 and its cover. In this respect, there is also a limit to reducing the disk unit in thickness.

Further, conventionally, the frame 1 and the cover are formed of shield material so as to also function as electromagnetic wave blockers. A shield plate is also attached to the lower surface of the tray 3 so as to provide a double shield structure. Thereby, the reduction of the disk unit in thickness is also limited.

Further, in the above-described disk unit, the tray guide mechanisms 9 are provided to the right and left sides of the tray 3 with the same orientation. Accordingly, the ground contact area of the tray guide mechanisms 9 is smaller when the disk unit is placed in a horizontal position than when the disk unit is placed in a vertical position.

In addition to the optical pickup 5, the tray 3 includes precision optical components such as a laser diode, a reflecting mirror, and an objective lens. Therefore, if the support structure of the tray 3 varies depending on the position or orientation of the disk unit, the vibration characteristic (resonant frequency) of the structure varies accordingly. Thus, it is impossible to support the tray 3 with the same vibration characteristic irrespective of the orientation of the disk unit.

Therefore, according to the conventional configuration, the vibration characteristic becomes stable or unstable depending on the orientation of the disk unit, which decreases the reliability of the disk unit.

Accordingly, it is a general object of the present invention to provide a disk unit in which the above-described disadvantages are eliminated.

A more specific object of the present invention is to provide a disk unit reduced in thickness or vertically reduced in size.

Another more specific object of the present invention is to provide a disk unit having a stable vibration characteristic irrespective of its orientation.

The above objects of the present invention are achieved by a disk unit including a tray including: a turntable to which a disk-like recording medium is attached; a tray guide mechanism supporting the tray so that the tray is movable between a disk-replacing position and a disk-loading position; and a cover formed to cover the disk-like recording medium when the tray is moved to the disk-loading position, wherein the cover comprises a guide support part supporting the tray guide mechanism.

According to the above-described disk unit, the guide support part is provided to the cover so that the cumulative value of the dimensional tolerances of the members can be reduced compared with the conventional configuration where the tray guide mechanism is supported by a frame. Accordingly, the clearances between the components provided between the tray and the cover can be reduced, and the disk unit can be made thinner by the thickness of the frame.

The above objects of the present invention are also achieved by a disk unit including: a tray including a turntable to which a disk-like recording medium is attached; a tray guide mechanism supporting the tray so that the tray is movable between a disk-replacing position and a disk-loading position; a shield cover formed to cover the disk-like recording medium when the tray is moved to the disk-loading position, the shield cover including first and second tray support parts provided on first and second sides of a lower face of the tray so as to oppose each other; and a shield plate provided so as to close an opening formed between the first and second tray support parts.

According to the above-described disk unit, the conventional frame formed of shield material can be dispensed with, so that the disk unit can be made thinner by the thickness of the frame.

The above objects of the present invention are also achieved by a disk unit including: a tray including a turntable to which a disk-like recording medium is attached and a pickup supported at a position opposing the disk-like recording medium so as to be movable in radial directions thereof; a tray guide mechanism supporting the tray so that the tray is movable between a disk-replacing position and a disk-loading position; and a case housing the tray when said tray is moved to the disk-loading position, wherein the tray has a smaller thickness in an end part thereof than in a range of movement of the pickup, the end part excluding at least the range of movement of the pickup, and the case comprises an opening formed in a region thereof, the region opposing the range of movement of the pickup.

According to the above-described disk unit, the opening is formed in the region of the cover which region opposes the thick part of the tray. Therefore, the disk unit can be reduced in thickness.

The above objects of the present invention are also achieved by a disk unit including: a tray including a turntable to which a disk-like recording medium is attached and a pickup supported at a position opposing the disk-like recording medium so as to be movable in radial directions thereof; a tray guide mechanism supporting the tray so that the tray is movable between a disk-replacing position and a disk-loading position; and a case housing the tray when the tray is moved to the disk-loading position, wherein the tray has a smaller thickness in an end part thereof than in a range of movement of the pickup, the end part excluding at least the range of movement of the pickup, and a flexible printed circuit connected to the turntable and the pickup is provided in a space formed between the case and the end part of the tray.

According to the above-described disk unit, the FPC is positioned so as not to overlap the attachment position of the turntable and the movement range of the pickup, so that the disk unit can be reduced in thickness.

The above objects of the present invention are also achieved by a disk unit including: a tray including a turntable to which a disk-like recording medium is attached; a tray guide mechanism supporting the tray so that the tray is movable between a disk-replacing position and a disk-loading position; and a case housing the tray when the tray is moved to the disk-loading position, wherein the case comprises an opening formed in a lower face thereof, and a shield plate is provided to close the opening of the case in a lower face of the tray.

According to the above-described disk unit, the number of components for shielding is reduced, so that the disk unit can be assembled with increased efficiency and can be reduced in weight as well.

The above objects of the present invention are further achieved by a disk unit including: a tray including a turntable to which a disk-like recording medium is attached; a first tray guide mechanism supporting a first side of the tray so that the first side is movable between a disk-replacing position and a disk-loading position; and a second tray guide mechanism supporting a second side of the tray so that the second side is movable between the disk-replacing position and the disk-loading position, wherein the first tray guide mechanism is provided in a vertical position and the second tray guide mechanism is provided in a horizontal position.

According to the above-described disk unit, the tray can be supported under substantially the same conditions whether the disk unit is placed in a horizontal or vertical position. Thereby, the vibration characteristic of the support structure of the tray can be prevented from varying depending on the attachment position of the disk unit, so that the reliability of the disk unit against vibration can be increased.

BRIEF DESCRIPTION OF THE DRAWINGS

Other objects, features and advantages of the present invention will become more apparent from the following detailed description when read in conjunction with the accompanying drawings, in which:

FIG. 13 is a bottom plan view of the shield cover of the disk unit of FIG. 2 according to the embodiment of the present invention;

FIGS. 15A and 15B are a top plan view and a right-side view, respectively, of the FPC of FIGS. 14A and 14B in an attached state according to the embodiment of the present invention.

DETAILED DESCRIPTION OF THE PREFERRED EMBODIMENTS

A description will now be given, with reference to the accompanying drawings, of an embodiment of the present invention.

Figure 1A:
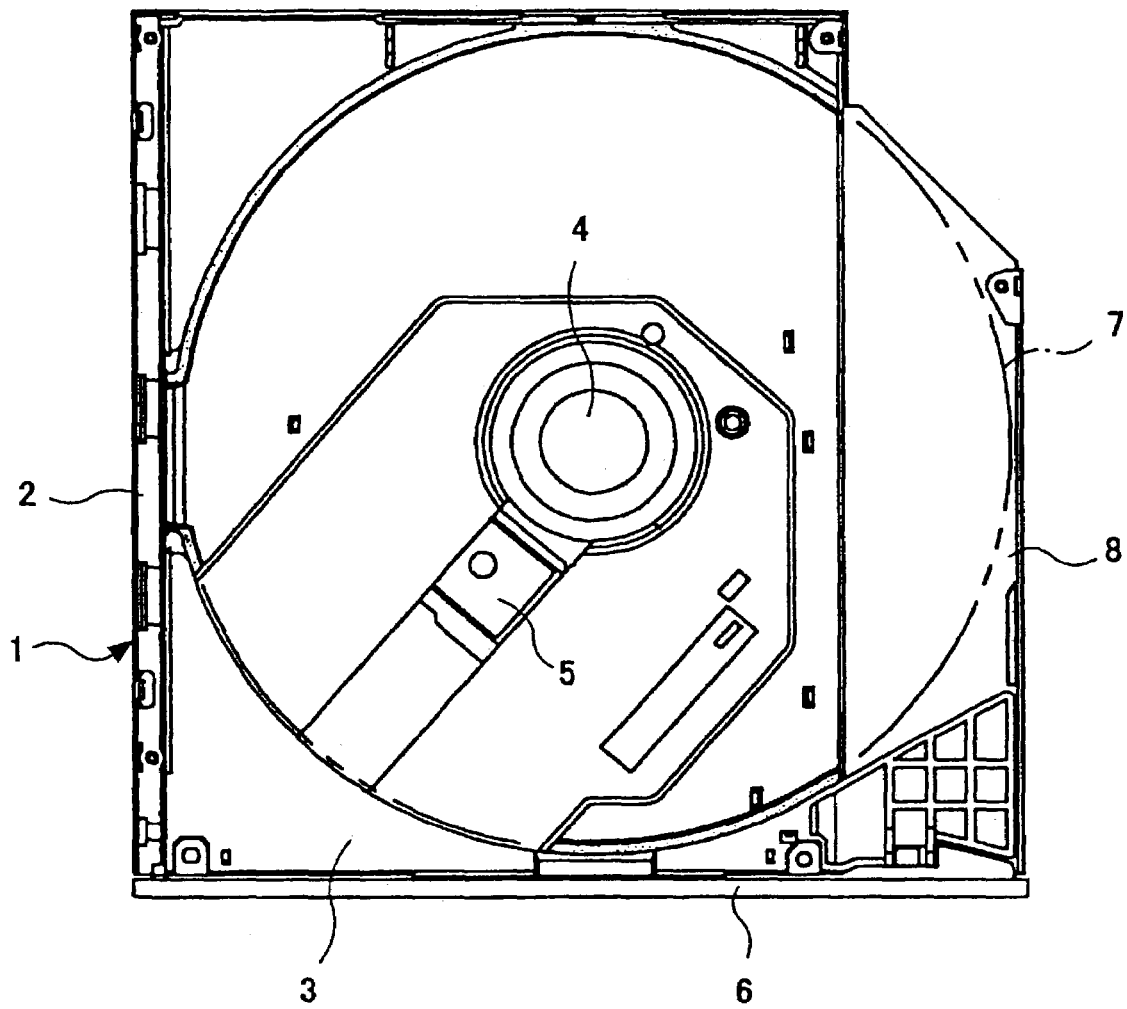
FIGS. 1A and 1B are diagrams showing a conventional disk unit.
Figure 1B:
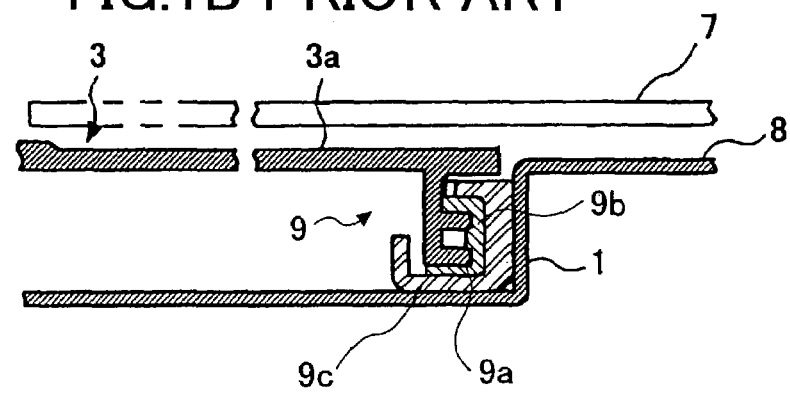
Figure 2:
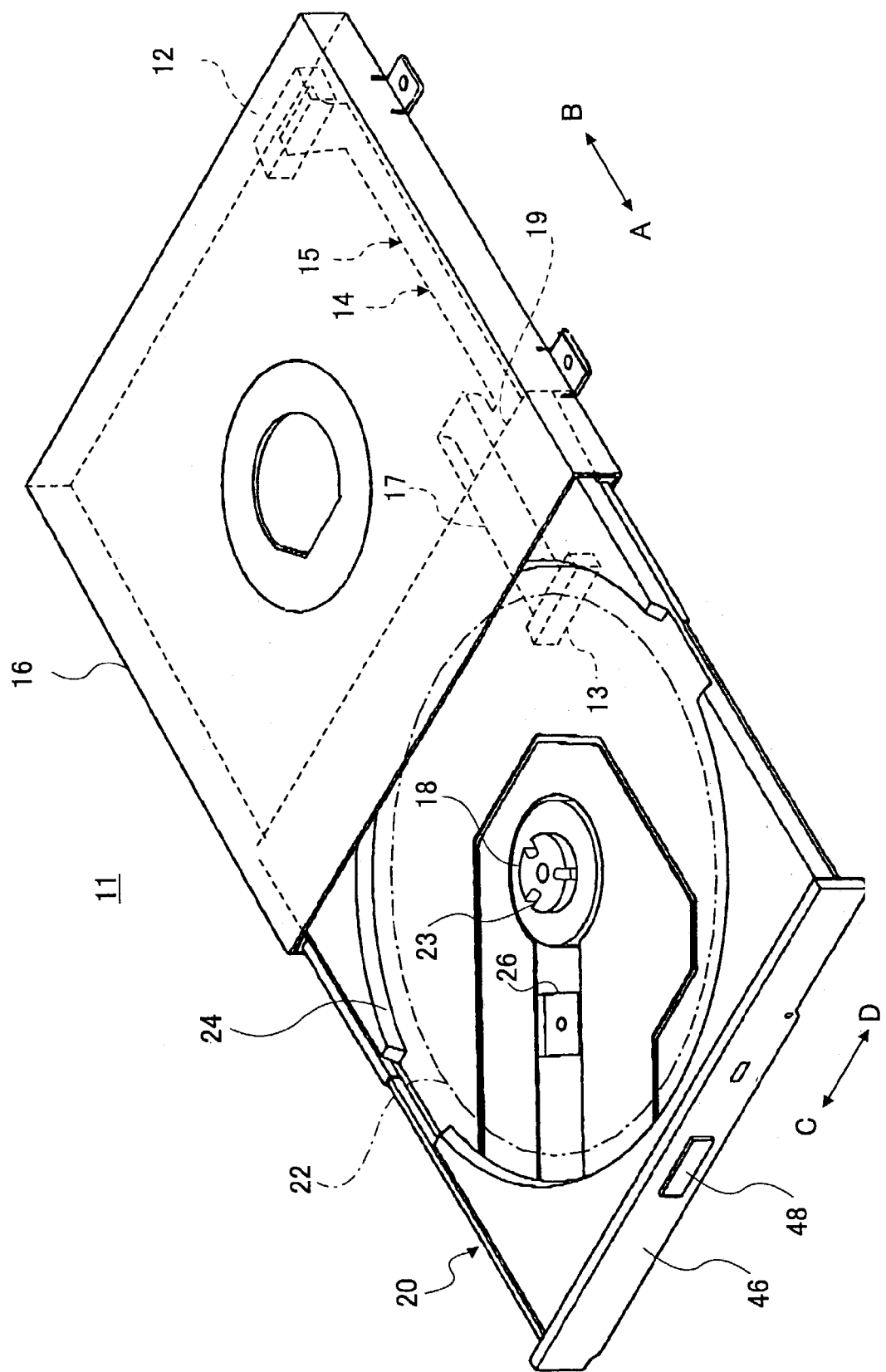
FIG. 2 is a perspective view of a disk unit according to an embodiment of the present invention.
Figure 3:
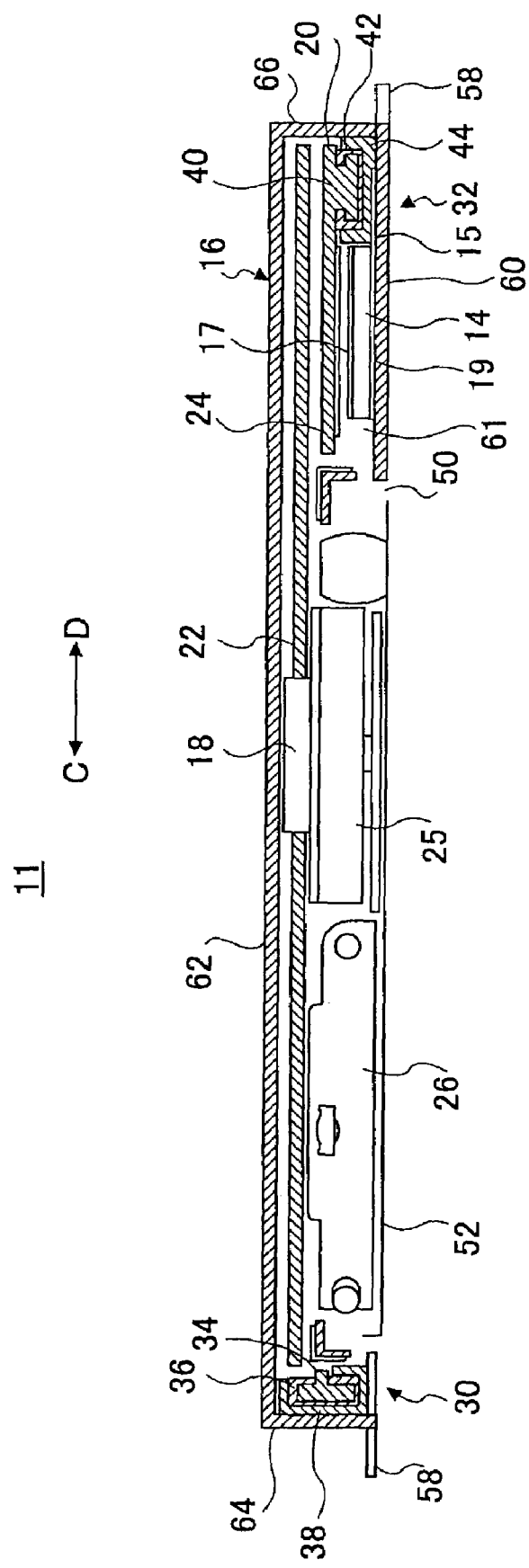
FIG. 3 is a sectional view of the disk unit of FIG. 2 taken along the directions indicated by arrows C and D according to the embodiment of the present invention.
Figure 4:
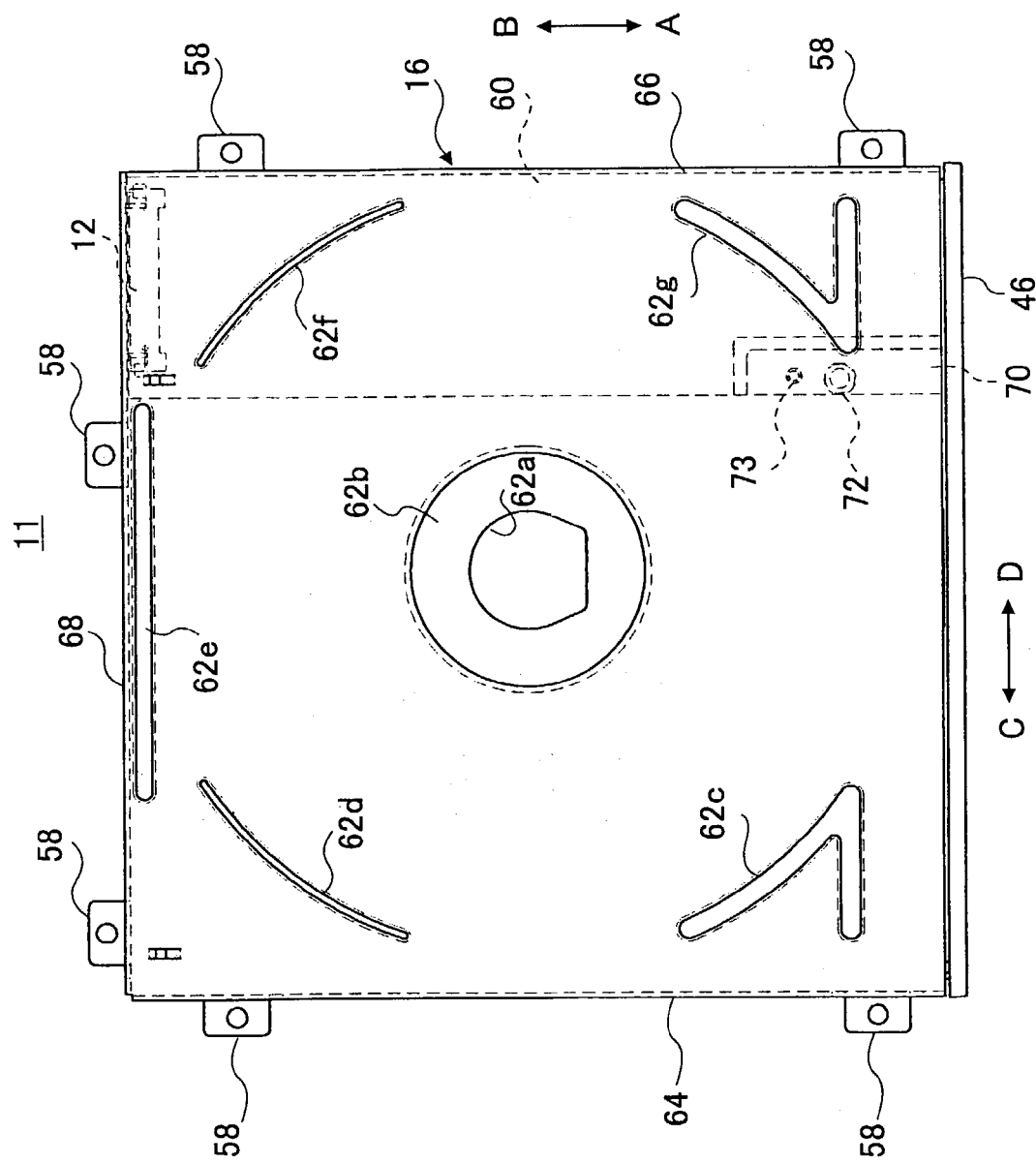
FIG. 4 is a top plan view of the disk unit of FIG. 2 according to the embodiment of the present invention.

FIG. 2 is a perspective view of a disk unit 11 according to the embodiment of the present invention. FIG. 3 is a sectional view of the disk unit 11 of FIG. 2 taken along the directions indicated by arrows C and D.

In FIGS. 2 and 3 and the following drawings, the sides of the disk unit 11 in the directions indicated by arrows A, B, C, and D are referred to as the front side (A side), the rear side (B side), the left side (C side), and the right side (D side), respectively.

As shown in FIGS. 2 and 3, the disk unit 11 is a drive unit to which a disk-like recording medium such as a CD-ROM, CD-R, CD-RW, DVD-ROM, or DVD-RAM is attached. The disk unit 11 includes a tray 20 supported so as to be slidable inside a shield cover (case) 16. Further, according to the disk unit 11, when an optical disk 22 (indicated by a dot-dash line) is placed on the tray 20 and the tray 20 is moved to a disk-loading position (where the optical disk is loaded into the disk unit 11) in the B direction, the tray 20 is housed inside the shield cover 16 so that information recording or reproduction is performed.

The tray 20 includes a turntable 18 and an optical pickup 26. The optical disk 22 is clamped to and rotated by the turntable 18. The optical pickup 26 is provided so as to be movable in the radial directions of the optical disk 22. The optical pickup 26 optically records information on or reads information from the optical disk 22.

The turntable 18 includes a clamp mechanism 23 that is fitted to the center hole of the disk 22 so as to clamp the disk 22 from its inner circumference. A disk holder 24 larger in diameter than the optical disk 22 is formed around the turntable 18.

Further, the optical pickup 26 reading information recorded on the optical disk 22 clamped by the clamp mechanism 23 of the turntable 18 is provided below the disk holder 24 so as to be movable in the radial directions of the optical disk 22. The right (D-side) end part of the tray 20, which is a part thereof other than the turntable 18 and the range of movement of the optical pickup 26, is formed to be thin, so that a space 61 containing a flexible printed circuit (FPC) 14 bent in a U shape is formed between the right end part of the tray 20 and a right-side bottom face 60 of the shield cover 16.

A connector 12 (indicated by a broken line in FIG. 2) provided to the shield cover 16 and a connector 13 (indicated by a broken line in FIG. 2) attached to the lower surface of the tray 20 are electrically connected through the FPC 14 (indicated by a broken line in FIG. 2). The FPC 14 is connected to a turntable driving motor 25 and the optical pickup 26 via the connector 13.

The FPC 14 includes a first printed board 15 connected to the fixed connector 12, a second printed board 17 connected to the movable connector 13, and a third printed board 19 connecting the first and second printed boards 15 and 17.

The second printed board 17 extends along the A and B directions on the B side of the third printed board 19. The second printed board 17 includes a U-shape bent part so that an end of the second printed board 17 is connected to the connector 13 attached to the lower surface of the tray 20. Therefore, the second printed board 17 of the FPC 14 is provided so that the bent part of the second printed board 17 is movable along the A and B directions with the movement of the tray 20.

Further, the tray 20 is supported so as to be slidable in the A and B directions by a tray guide mechanism 30 supported by a left-side face (a first tray support part) 64 of the shield cover 16 and a tray guide mechanism 32 supported by a right-side face 66 and the right-side bottom face (a second tray support part) 60 of the shield cover 16. The tray 20 is manually operated to be moved to a disk-replacing position (where the optical disk 22 is replaced with another optical disk) or the disk-loading position. Thus, in the disk unit 11, the tray guide mechanisms 30 and 32 are supported not by a frame as conventionally, but by the shield cover 16. This configuration reduces the cumulative value of the dimensional tolerances of the members so that the clearance between the tray 20 and the shield cover 16 can be decreased. Further, since no conventional frame is employed, the disk unit 11 can be made thinner by the thickness of the frame.

Further, the first printed board 15 of the FPC 14 is fixed so as to be interposed between the right-side bottom face 60 of the shield cover 16 and the tray guide mechanism 32, and the second printed board 17 of the FPC 14 is contained, bent in a U shape, in the space 61 formed between the right-side bottom face 60 and the disk holder 24 of the tray 20. Thus, the FPC 14 is housed in the space 61 off the movement range of the optical pickup 26 and the attachment position of the turntable 18 where the height or vertical dimension of the turntable 18 reaches a limit. This configuration may contribute to the reduction in thickness of the disk unit 11.

The first tray guide mechanism 30 provided on the left side (C side) of the tray 20 is oriented so that its sliding area is larger in the vertical plane. The second tray guide mechanism 32 provided on the right side (D side) of the tray 20 is oriented so that its sliding area is larger in the horizontal plane. The sliding area refers to an area over which each of the first and second guide mechanisms 30 and 32 slides.

The first tray guide mechanism 30 is attached in a vertical position. The first tray guide mechanism 30 includes a guide rail 34, a slide rail 36, and a guide rail 38. As shown in FIG. 3, the guide rail 34, whose cross section is shaped like a letter T, is attached to the left-side face of the tray 20. The slide rail 36 is formed to have a C-shaped cross section so as to slide on the left-side face and the upper and lower projections of the guide rail 34. The guide rail 38, which is formed to have a C-shaped cross section so as to enclose the left-side face and the upper and lower ends of the slide rail 36, is fixed to the shield cover 16.

The second tray guide mechanism 32 is attached in a horizontal position so as to have an orientation 90° different from that of the first tray guide mechanism. The second tray guide mechanism 32 includes a guide rail 40, a slide rail 42, and a guide rail 44. As shown in FIG. 3, the guide rail 40, whose cross section is shaped like a letter T, is attached on the right side of the lower surface of the tray 20. The slide rail 42 is formed to have a C-shaped cross section so as to slide on the lower face and the right and left projections of the guide rail 40. The guide rail 44, which is formed to have a C-shaped cross section so as to enclose the lower face and the right and left ends of the slide rail 42, is fixed to the shield cover 16.

When an eject switch button 48 provided to a front bezel 46 of the tray 20 is pressed, a lock on the tray 20 set by a lock mechanism (not shown in the drawings) is released so that the tray 20 is pushed out in the A direction by a predetermined distance. Then, the operator manually pulls the front bezel 46 in the A direction. Thereby, the tray 20 guided by the tray guide mechanisms 30 and 32 slides in the A direction so that the disk holder 24 moves out of the shield cover 16 to reach the exposed disk-replacing position.

Therefore, when the disk unit 11 is placed in a horizontal position, the second tray guide mechanism 32 requires a larger placement area that the first tray guide mechanism 30. On the other hand, when the disk unit 11 is placed in a vertical position, the first tray guide mechanism 30 requires a larger placement area than the second tray guide mechanism 32.

The disk unit 11 is configured so that the sum of the placement (ground contact) areas of the first and second tray guide mechanisms 30 and 32 remains substantially the same in the horizontal position and in the vertical position. Therefore, the tray 20 is supported to be slidable by the tray guide mechanisms 30 and 32 under substantially the same conditions irrespective of whether the disk unit 11 is in a horizontal or vertical position. This makes it possible to improve the vibration characteristic of the configuration supporting the turntable 18 and the optical pickup 26 mounted on the tray 20 so that the vibration characteristic does not vary depending on the orientation of the disk unit 11.

Accordingly, the disk unit 11 is enabled to support the tray 20 under substantially the same conditions in the horizontal and vertical positions alike. Thereby, the vibration characteristic can be prevented from varying based on the attachment position of the disk unit, so that the reliability of the disk unit 11 against vibration can be increased.

Further, the vertical dimensions of the turntable driving motor 25 and the optical pickup 26 are substantially reduced to their limits. Therefore, it is difficult to further reduce the thickness of the disk unit 11 in the region including the attachment position of the turntable 18 and the movement range of the optical pickup 26. Accordingly, in the disk unit 11, an opening 50 is formed in the region of the shield cover 16 which region opposes the lower surface of the tray 20. A shield plate 52 formed in a shape corresponding to the opening 50 is fixed to the lower surface of the tray 20.

By thus forming the opening 50 in the region of the shield cover 16 corresponding to the above-described thick region of the tray 20, the disk unit 11 can be reduced in thickness.

The turntable driving motor 25 and the optical pickup 26 are protected by the shield cover 16 and the shield plate 52 so as not to be affected by electromagnetic waves. Further, the right-side bottom face 60 of the shield cover 16 and the shield plate 52 are arranged in the C and D directions so as not to overlap each other in the vertical directions, thereby contributing to the reduction of the thickness of the disk unit 11.

By thus providing the shield plate 52, the disk unit 11 can dispense with a conventional frame formed of shield material. Therefore, the disk unit 11 can be reduced in size vertically by the thickness of the frame.

Further, the number of components for shielding can be reduced. Therefore, the disk unit 11 can be assembled with improved efficiency and can be reduced in weight as well.

FIGS. 4 through 8 are a top plan view, a front elevational view, a rear elevational view, a right-side (D-side) view, and a bottom plan view, respectively, of the disk unit 11.

As shown in FIGS. 4 through 8, when the tray 20 is housed inside the shield cover 16, only the front bezel 46 is exposed on the front side (A side) of the shield cover 16 in the disk unit 11. This state of the disk unit 11 is referred to as a disk-loaded state. In this state, the optical pickup 26 reads information from or writes information to the optical disk 22 attached to the turntable 18.

Further, the front bezel 46 includes a lens 54 of an LED (light-emitting diode) that flashes on and off when the turntable 18 is in operation and an insertion hole 56 for emergency disk ejection. A wire such as a clip is inserted into the insertion hole 56 so as to release a lock on the tray 20 when the tray 20 is not ejected by pressing the eject switch button 48.

Figure 5:
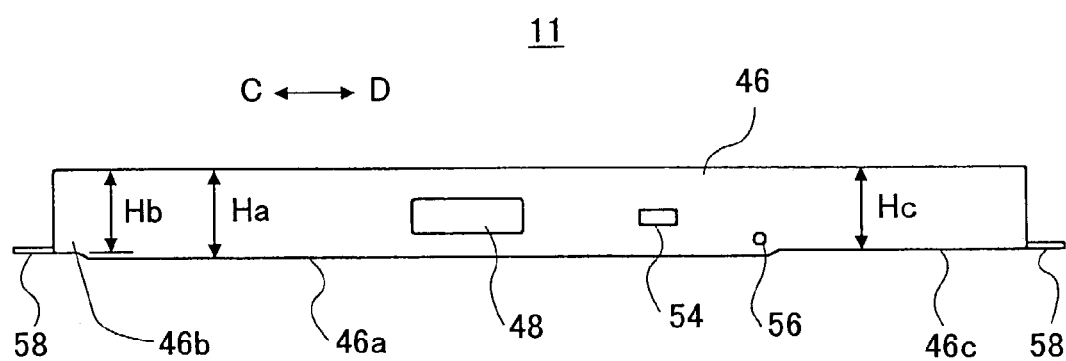
FIG. 5 is a front elevational view of the disk unit of FIG. 2 according to the embodiment of the present invention.
Figure 6:
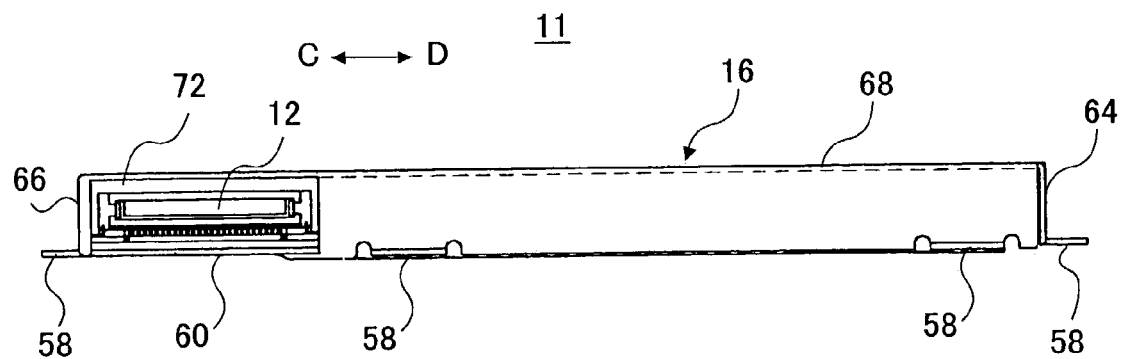
FIG. 6 is a rear elevational view of the disk unit of FIG. 2 according to the embodiment of the present invention.
Figure 7:
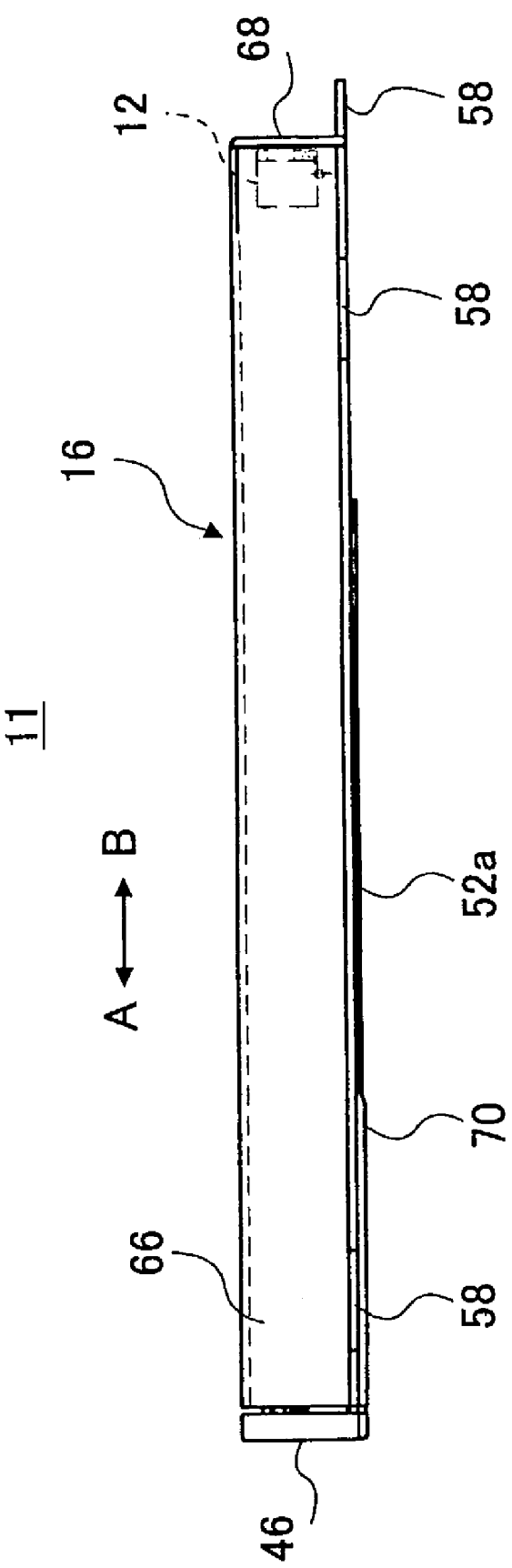
FIG. 7 is a right-side view of the disk unit of FIG. 2 according to the embodiment of the present invention.
Figure 8:
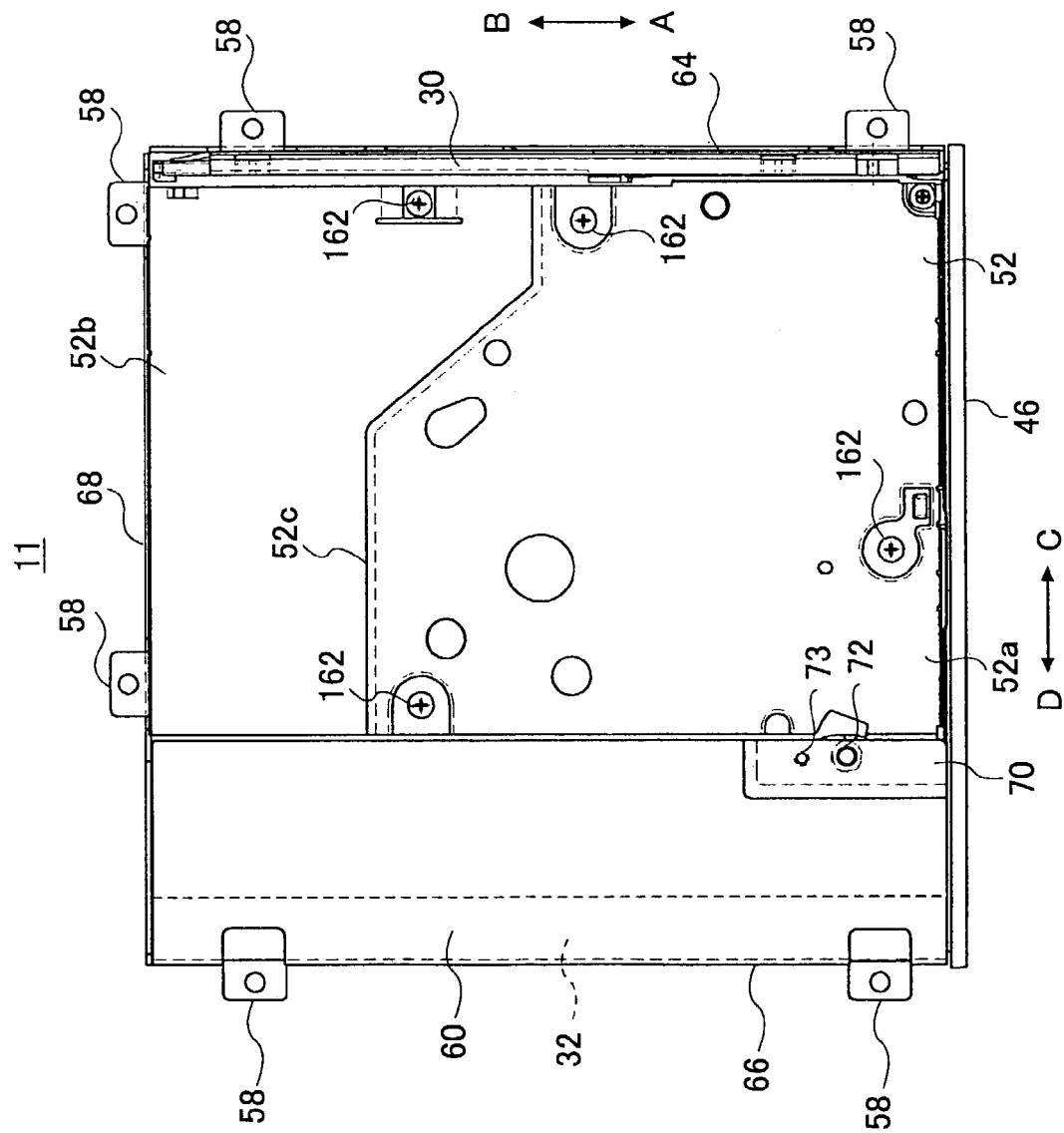
FIG. 8 is a bottom plan view of the disk unit of FIG. 2 according to the embodiment of the present invention.
Figure 9:
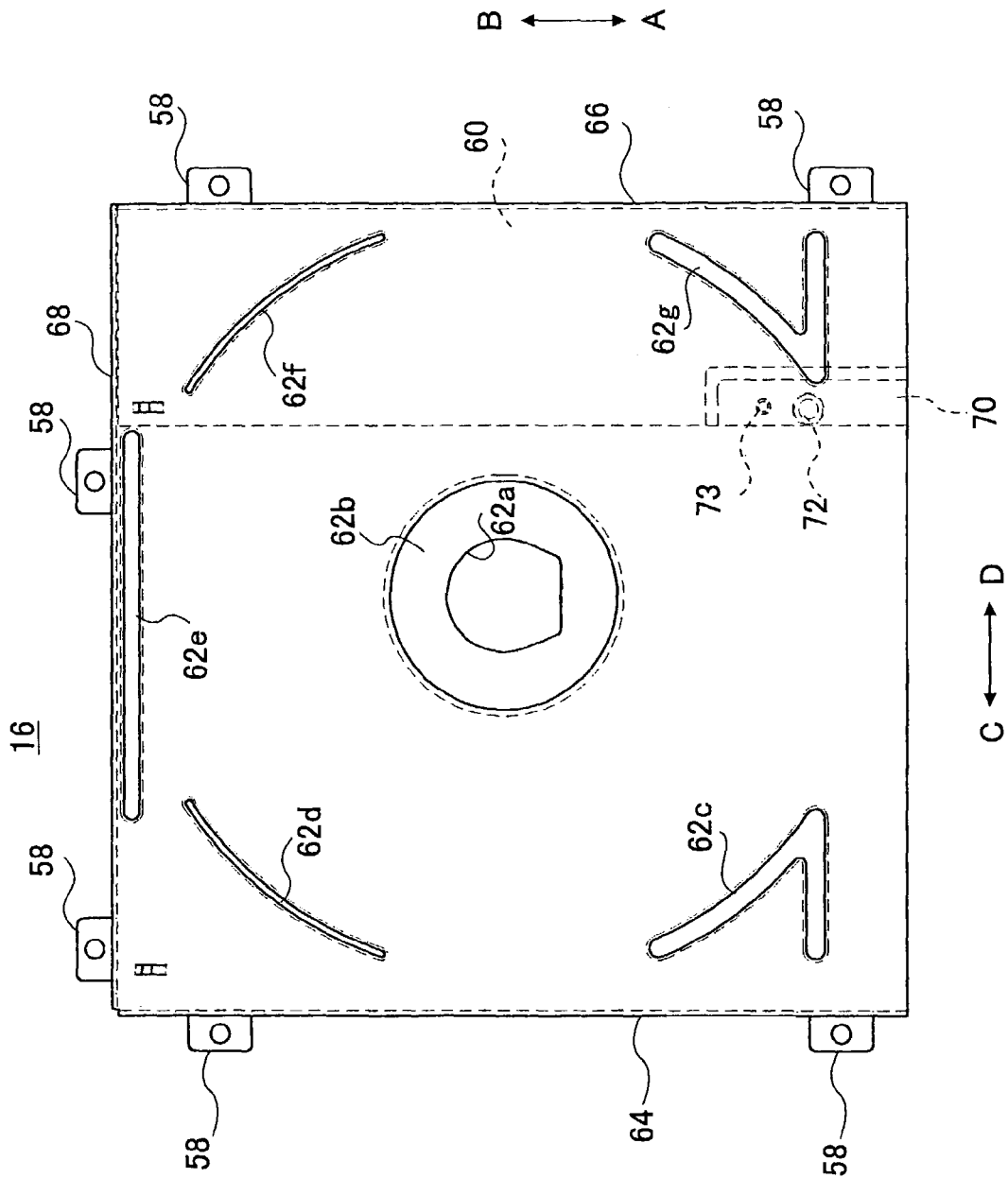
FIG. 9 is a top plan view of a shield cover of the disk unit of FIG. 2 according to the embodiment of the present invention.
Figure 10:
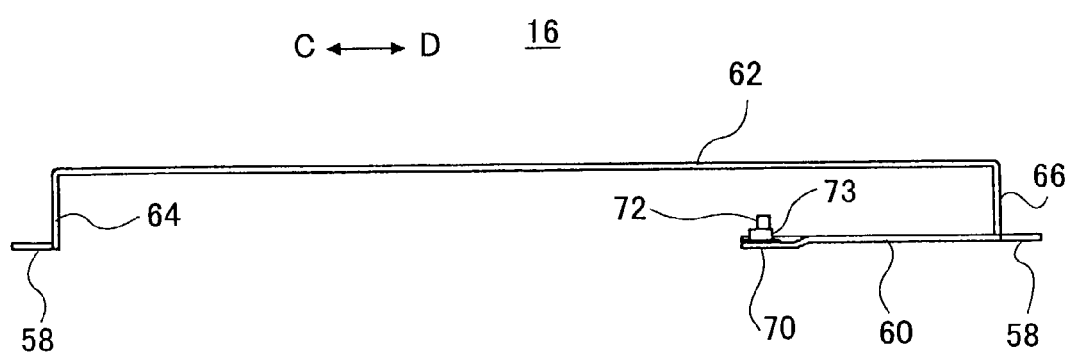
FIG. 10 is a front elevational view of the shield cover of the disk unit of FIG. 2 according to the embodiment of the present invention.
Figure 11:
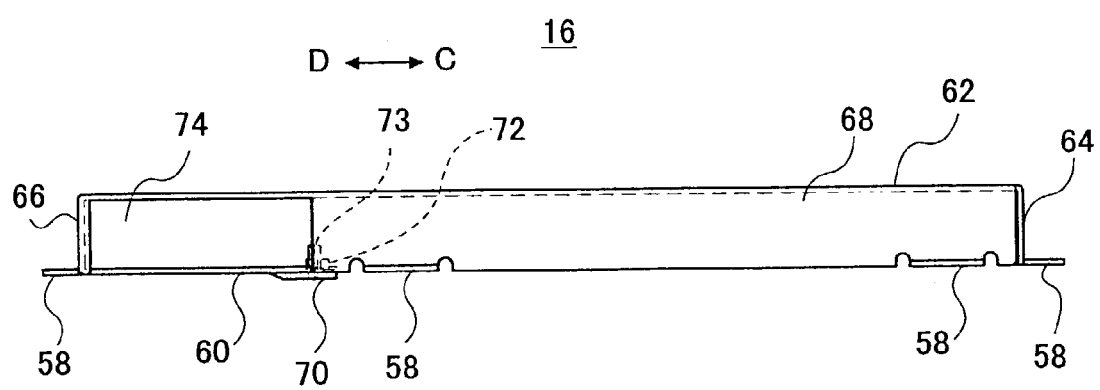
FIG. 11 is a rear elevational view of the shield cover of the disk unit of FIG. 2 according to the embodiment of the present invention.
Figure 12:
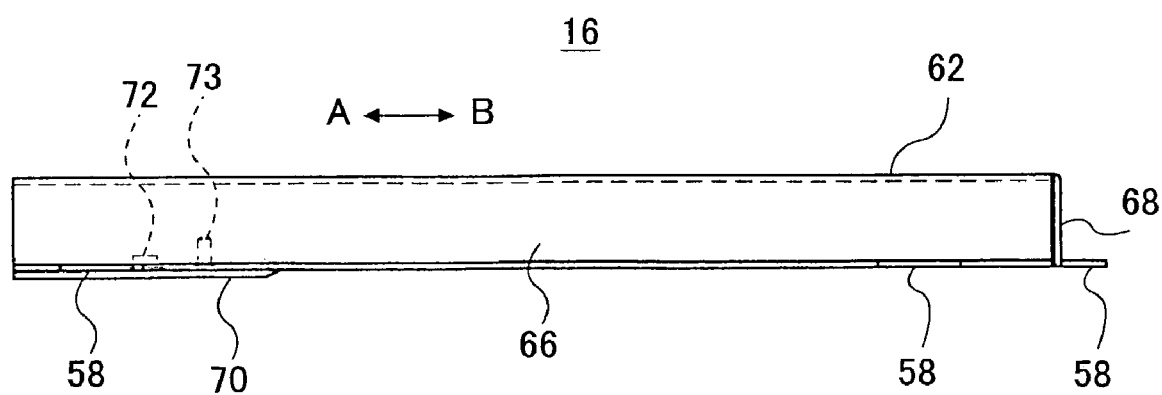
FIG. 12 is a right-side view of the shield cover of the disk unit of FIG. 2 according to the embodiment of the present invention.

FIG. 5 shows that the front bezel 46 is formed so that the height Hb of a left-side region 46b thereof and the height Hc of a right-side region 46c thereof are smaller than the height Ha of a region 46a thereof covering the attachment position of the turntable 18 and the movement range of the optical pickup 26. Therefore, the vertical size of the front bezel is reduced in the region except the region 46a, that is, in the regions 46b and 46c. Accordingly, the front bezel 46 protrudes downward more in the region 46a than in the regions 46b and 46c by the difference between Ha and Hb or Hc.

The shield cover 16 includes fixation parts 58 through which the shield cover 16 is fixed to the frame of a personal computer (not shown in the drawings). The fixation parts 58 project horizontally from the bottom parts of the right, left, and rear sides of the shield cover 16.

The right-side bottom face 60, which is an integral part of the shield cover 16, and the shield plate 52 attached to the lower surface of the tray 20 form the bottom face of the disk unit 11. The right-side bottom face 60 of the shield cover 16, which corresponds to the right-side region 46c of the front bezel 46, is formed so as to provide the shield cover 16 with a vertical dimension smaller than that at the attachment position of the shield plate 52.

The shield cover 52 is formed to cover the attachment position of the turntable 18 and the movement range of the optical pickup 26 from the lower side. The shield cover 52 is fastened to the tray 20 with a plurality of screws 162. Further, the shield cover 52 is formed by press working into a shape including a depressed part so as to correspond to the region 46a of the front bezel 46. Therefore, the shield plate 52 has a larger vertical dimension (or is thicker) in a front area 52a thereof corresponding to the attachment position of the turntable 18 and the movement range of the optical pickup 26 than in a rear region 52b thereof, so that a step 52c is formed in the boundary between the front and rear regions 52a and 52b.

A description will be given of a configuration of the shield cover 16.

FIGS. 9 through 13 are a top plan view, a front elevational view, a rear elevational view, a right-side (D-side) view, and a bottom plan view, respectively, of the shield cover 16.

As shown in FIGS. 9 through 13, the shield cover 16 includes an upper face 62 covering the disk holder 24 of the tray 20, the right-side face 66 and the left-side face 64 attached to the right and left ends, respectively, of the upper face 62 toward the downward direction so as to oppose each other, a rear face 68 attached to the rear end of the upper face 62 toward the downward direction, and the right-side bottom face 60 attached to the lower end of the right-side face 66 so as to oppose the lower surface of the tray 20.

A through hole 62a is formed approximately in the center of the upper face 62 at the position opposing the turntable 18. Further, a part 62b depressed in the downward direction is formed around the through hole 62a. The through hole 62a is hermetically sealed with a transparent adhesive seal (not shown in the drawings). A plurality of reinforcement ribs 62c through 62g project from the upper face 62 so as to oppose the periphery of the optical disk 22. Thereby, the strength of the shield cover 16 is secured. Further, when the optical disk 22 is displaced in the upward direction by external impact while being rotated, the periphery of the optical disk 22 comes into contact with the reinforcement ribs 62c through 62g so that the remaining part of the optical disk 22 is prevented from touching the upper face 62. Thereby, the optical disk 22 is protected.

A part 70 depressed in the downward direction is formed on the front end of the right-side bottom face 60 of the shield cover 16. Lock pins 72 and 73 for engaging and stopping a lock lever (not shown in the drawings) locking the tray 20 when the tray 20 is moved to the disk-loading position are provided to the depressed part 70 in upright positions.

Further, the rear face 68 of the shield cover 16 includes a connector opening 74 for exposing the connection part of the connector 12 supported on the right-side bottom face 60.

A description will be given of the FPC 14.

Figure 14A:
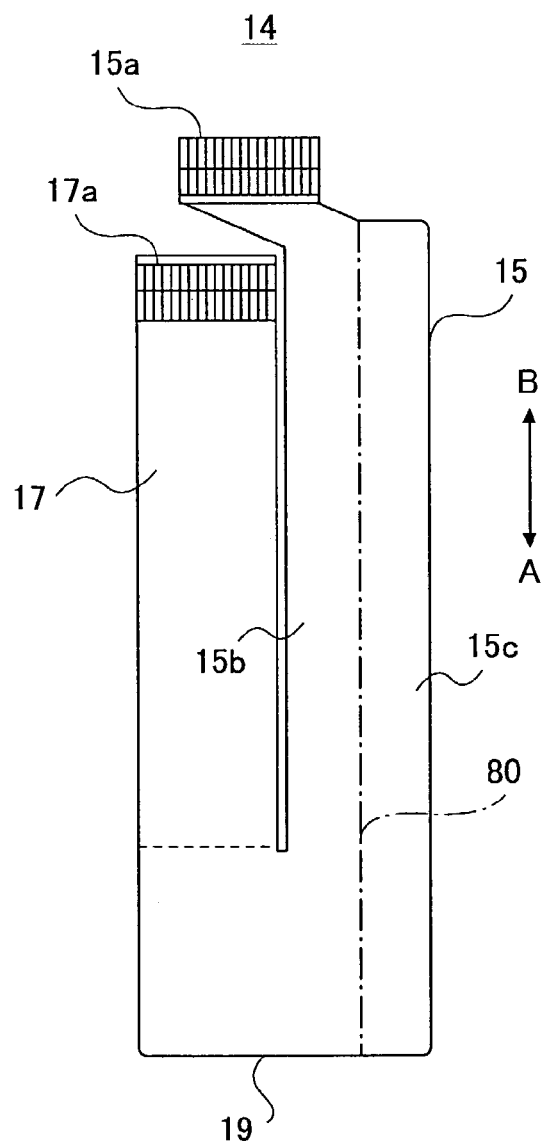
FIGS. 14A and 14B are top plan views of an FPC of the disk unit of FIG. 2, illustrating a shape of the FPC according to the embodiment of the present invention.
Figure 14B:
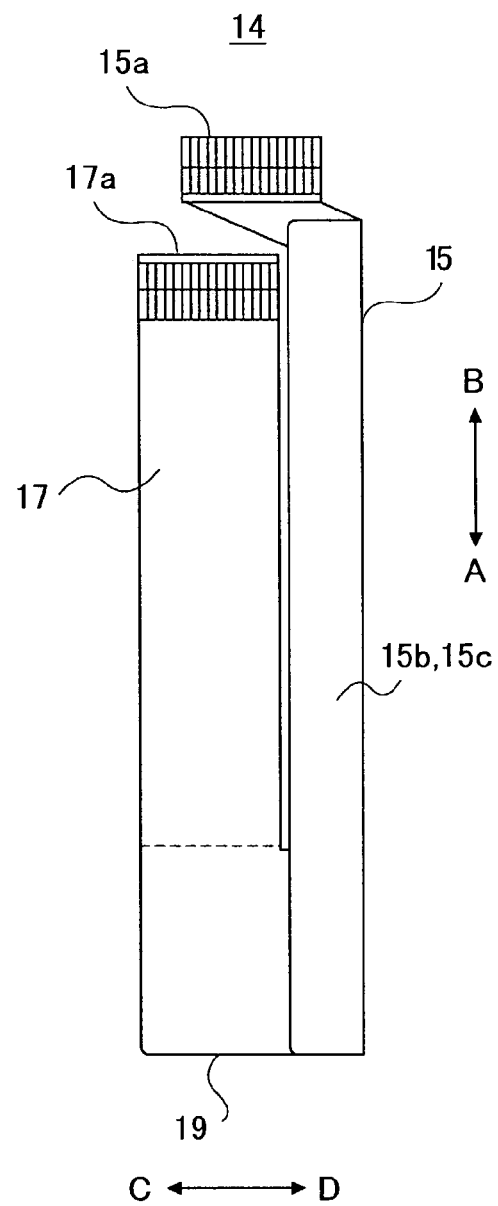

FIGS. 14A and 14B are top plan views of the FPC 14, illustrating a shape of the FPC 14. FIGS. 15A and 15B are a top plan view and a right-side (A-side) view, respectively, of the FPC 14 in an attached state.

As shown in FIG. 14A, the first and second printed boards 15 and 17 extend parallel to each other so as to have respective ends connected to the third printed board 19 so that the first through third printed boards 15, 17, and 19 are integrated into the FPC 14. The first printed board 15 includes a terminal 15a formed of a plurality of electrodes arranged in parallel to be connected to the fixed connector 12. The second printed board 17 includes a terminal 17a formed of a plurality of electrodes arranged in parallel to be connected to the movable connector 13.

As shown in FIG. 14B, the first printed board 15A is folded along a center line 80 extending in the A and B directions so that a region 15c on the right side of the center line 80 is superimposed on a region 15b on the left side of the center line 80. Thereby, the horizontal dimension or width of the first printed board 15 is reduced by half so as to be employable in the disk unit 11 reduced in space.

As shown in FIG. 15A, when the FPC 14 is attached to the disk unit 11, the second printed board 17 is bent in a U-letter shape so as to extend in the A direction. Thus, by forming a bent part 17b in the second printed board 17, the terminal 17a can be connected to the connector 13 of the tray 20. Further, the bent part 17b moves with the movement of the tray 20 in the A and B directions so as not to hinder the movement of the tray 20.

Figure 16:
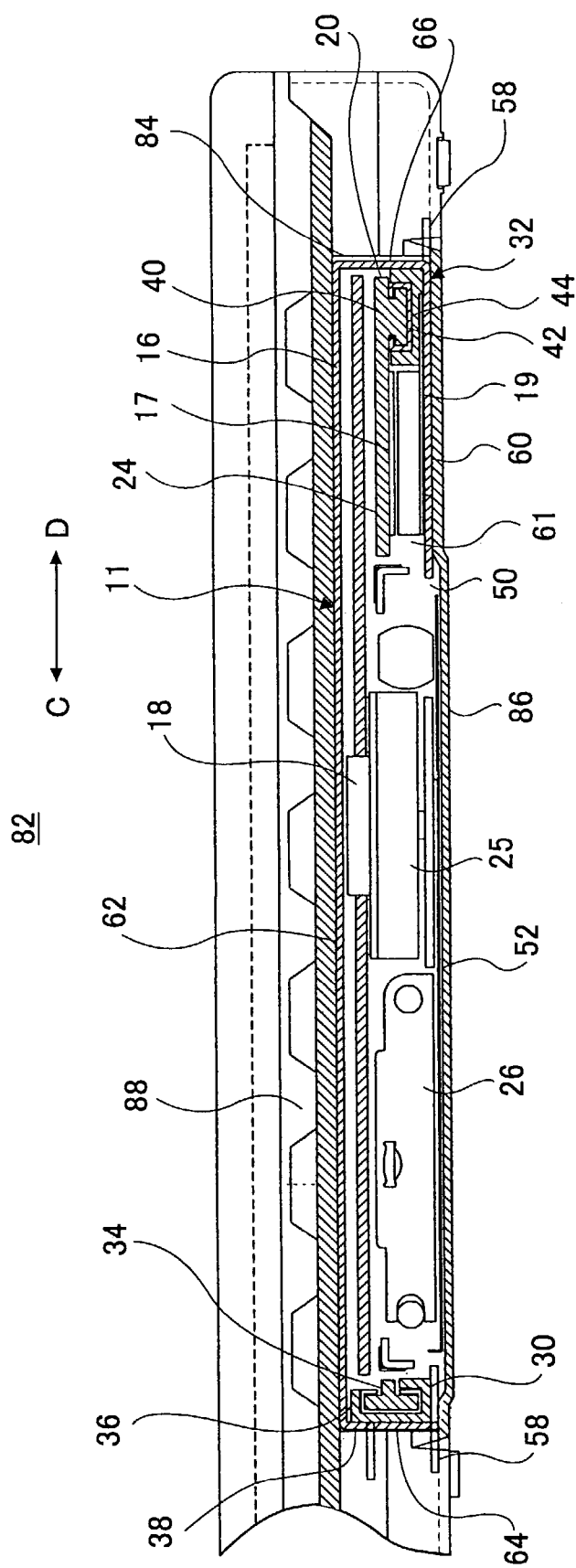
FIG. 16 is a sectional view of a notebook personal computer housing the disk unit of FIG. 2 taken along the C and D directions according to the embodiment of the present invention.

FIG. 16 is a sectional view of a notebook personal computer 82 housing the disk unit 11 according to the embodiment taken along the C and D directions.

As shown in FIG. 16, with the disk unit 11 being inserted into a disk unit housing 84 formed on a side of the notebook personal computer 82, the fixation parts 58 projecting from the right, left, and rear sides 66, 64, and 68 of the shield cover 16 are fastened to the notebook personal computer 82 with screws. Then, a keyboard 88 is attached on the disk unit 11.

In the notebook personal computer 82, the tray guide mechanisms 30 and 32 guiding the tray 20 are supported by the shield cover 16. Therefore, the cumulative value of the clearances between the components provided between the tray 20 and the shield cover 16 is reduced, so that the notebook personal computer 82 can be reduced in thickness or can be reduced in size vertically. Further, since the disk unit 11 requires no conventional frame, the notebook personal computer 82 can be made thinner by the thickness of the frame.

In the above-described embodiment, the disk unit 11 is incorporated into the notebook personal computer 82. However, the disk unit 11 is also applicable to a desktop personal computer having a vertical housing reduced in width or reduced in size horizontally.

The present invention is not limited to the specifically disclosed embodiment, but variations and modifications may be made without departing from the scope of the present invention.

The present application is based on Japanese priority applications No. 2002-046870 and No. 2002-046877 both filed on Feb. 22, 2002, the entire contents of which are hereby incorporated by reference.

What is claimed is:

1. A disk unit, comprising:
   a tray including a turntable to which a disk recording medium is attachable;
   a tray guide mechanism supporting said tray so that said tray is movable between a disk-replacing position and a disk-loading position; and
   a case formed to house the tray when said tray is moved to the disk-loading position,
   wherein said case comprises;
      a guide support part supporting said tray guide mechanism;
      a cover configured to cover the disk recording medium on the tray when said tray is moved to the disk-loading position with the disk recording medium being thereon; and
      a substantial opening formed in a region of the case on an underside of the tray, with the region opposing the range of movement of the pickup; and
   the cover and the guide support part are integrally formed.

2. The disk unit as claimed in claim 1, wherein:
   said tray guide mechanism comprises first and second guide mechanisms positioned with first and second orientations different from each other by 90°, the first and second guide mechanisms being provided on first and second opposing sides of the disk unit; and
   said guide support part comprises first and second support parts supporting the first and second guide mechanisms, respectively, the first and second support parts being positioned with the first and second orientations, respectively.

3. The disk unit as claimed in claim 2, wherein:
   said tray includes a first face on which the disk recording medium is placed and a second face opposing the first face; and
   the first support part is provided to oppose the second face of said tray so that the first guide mechanism supports the second face of said tray.

4. The disk unit as claimed in claim 3, wherein an electric circuit connected to the turntable and an optical pickup of said tray is provided in a space formed between the first support part and the second face of said tray.

5. The disk unit as claimed in claim 2, wherein:
   said tray includes a first face on which the disk recording medium is placed and a second face opposing the first face;
   the first support part is provided parallel to the second face of said tray; and
   the second support part is provided vertical to the second face of said tray.

6. The disk unit as claimed in claim 2, wherein said cover is formed between the first and second support parts composed of shield material against electromagnetic waves, and has an opening closed by a shield plate.

7. The disk unit as claimed in claim 2, wherein the first and second guide mechanisms guide first and second sides, respectively, of said tray, the first and second sides being oriented perpendicular to each other.

8. The disk unit, as claimed in claim 2
   wherein said first tray guide mechanism is oriented so that it slides along a substantially vertical plane and said second tray guide mechanism is oriented so that it slides along a substantially horizontal plane.

9. The disk unit as claimed in claim 8, wherein a flexible printed circuit is provided between the second tray guide mechanism and a support part supporting the second tray guide mechanism.

10. The disk unit, as claimed in claim 1 wherein said cover is
   a shield cover formed to cover the disk-like recording medium when said tray is moved to the disk-loading position with the disk recording medium being thereon, the shield cover comprising first and second tray support parts provided on first and second sides of a lower face of said tray so as to oppose each other; and a shield plate extending between said first and second tray support parts of said shield cover so as to close an opening in the shield cover facing the lower surface of the tray and with the shield plate being connected to the tray.

11. The disk unit as claimed in claim 10, wherein the tray comprises a disk holding part configured to hold the disk recording medium so that the disk recording medium is held in the tray without projecting radially therefrom.

12. The disk unit, as claimed in claim 1
   wherein:
   said tray has a smaller thickness in an end part thereof than in a range of movement of the pickup, the end part excluding at least the range of movement of the pickup.

13. The disk unit as claimed in claim 12, wherein the region of said case in which region the opening is formed further opposes a position where the turntable is attached to said tray.

14. The disk unit as claimed in claim 12, wherein the tray comprises a disk holding part configured to hold the disk recording medium so that the disk recording medium is held in the tray without projecting radially therefrom.

15. The disk unit, as claimed in claim 1 further comprising:
   a pickup supported at a position opposing the disk recording medium so as to be movable in a radial direction; and
   wherein:
   said tray has a smaller thickness in an end part thereof than in a range of movement of the pickup, the end part excluding at least the range of movement of the pickup; and
   a flexible printed circuit is connected to the turntable and the pickup is provided in a space formed between said case and the end part of said tray, with the flexible printed circuit further including a U-shaped bent part so as to be movable with movement of the tray with the bent part moving in a direction of the movement of the tray as the tray moves.

16. The disk unit as claimed in claim 15, wherein the tray comprises a disk holding part configured to hold the disk recording medium so that the disk recording medium is herd in the tray without projecting radially therefrom.

17. The disk unit, as claimed in claim 1 further comprising:
   a shield plate extending so as to close the opening of said case facing a lower surface of the tray, the shield plate being connected to the lower surface of the tray.

18. The disk unit as claimed in claim 17, wherein the tray comprises a disk holding part configured to hold the disk recording medium so that the disk recording medium is held in the tray without projecting radially therefrom.

19. The disk unit, as claimed in claim 1, wherein the tray comprises a disk holding part configured to hold the disk recording medium so that the disk recording medium is held in the tray without projecting radially therefrom.

* * * * *